(12) United States Patent
Islam et al.

(10) Patent No.: US 10,877,350 B2
(45) Date of Patent: Dec. 29, 2020

(54) MACH-ZEHNDER MODULATOR DRIVER

(71) Applicant: Intel Corporation, Santa Clara, CA (US)

(72) Inventors: Syed S. Islam, Cupertino, CA (US); Raghuram Narayan, Newark, CA (US); Syed Reza Bahadur, Fremont, CA (US); Bharadwaj Parthasarathy, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 16/231,915

(22) Filed: Dec. 24, 2018

(65) Prior Publication Data

US 2019/0137842 A1  May 9, 2019

(51) Int. Cl.
| | |
|---|---|
| *G02F 1/00* | (2006.01) |
| *G02F 1/225* | (2006.01) |
| *H04B 10/548* | (2013.01) |
| *G02F 1/025* | (2006.01) |
| *G02F 1/21* | (2006.01) |

(52) U.S. Cl.
CPC ............ *G02F 1/2257* (2013.01); *G02F 1/025* (2013.01); *G02F 1/2255* (2013.01); *H04B 10/548* (2013.01); *G02F 2001/212* (2013.01)

(58) Field of Classification Search
CPC ...... G02F 1/2257; G02F 1/025; G02F 1/2255; G02F 2001/212; H04B 10/548
USPC .......... 359/237; 385/2, 3, 140; 298/135, 186
See application file for complete search history.

(56) References Cited

U.S. PATENT DOCUMENTS 9,306,780 B2 * 4/2016 Shang ............... H04L 25/03057

\* cited by examiner

*Primary Examiner* — William Choi
(74) *Attorney, Agent, or Firm* — Patent Capital Group (57) ABSTRACT

Embodiments may relate to a segment driver that is to be coupled with a modulator segment of a Mach-Zehnder modulator. The segment driver may include a continuous-time linear equalizer (CTLE) incorporated within an amplifier stage of the modulator. The CTLE may be configured to identify an electrical signal that is related to an optical signal of the Mach-Zehnder modulator; reduce inter-symbol interference (ISI) of the electrical signal to generate a processed electrical signal; and output the processed electrical signal to the amplifier stage. Other embodiments may be described or claimed.

20 Claims, 6 Drawing Sheets

MACH-ZEHNDER MODULATOR DRIVER

BACKGROUND

A Mach-Zehnder modulator (MZM) driver may require a large voltage swing across a long array of p-n junctions distributed around the waveguide that guides the light wave from the laser source. The achievable extinction ratio (ER) of the modulated output light wave may be proportional to the product of the driver output voltage swing and the modulator length. As such, an increase in modulator length may be desirable to increase the achievable ER, but it may be difficult to maintain good eye opening over the increased modulator length.

DETAILED DESCRIPTION

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

In various embodiments, the phrase "a first feature formed, deposited, or otherwise disposed on a second feature," may mean that the first feature is formed, deposited, or disposed over the feature layer, and at least a part of the first feature may be in direct contact (e.g., direct physical or electrical contact) or indirect contact (e.g., having one or more other features between the first feature and the second feature) with at least a part of the second feature.

Various operations may be described as multiple discrete operations in turn, in a manner that is most helpful in understanding the claimed subject matter. However, the order of description should not be construed as to imply that these operations are necessarily order dependent.

Embodiments herein may be described with respect to various Figures. Unless explicitly stated, the dimensions of the Figures are intended to be simplified illustrative examples, rather than depictions of relative dimensions. For example, various lengths/widths/heights of elements in the Figures may not be drawn to scale unless indicated otherwise. Additionally, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined, e.g., using scanning electron microscopy (SEM) images or transmission electron microscope (TEM) images. In such images of real structures, possible processing defects could also be visible, e.g., not-perfectly straight edges of materials, tapered vias or other openings, inadvertent rounding of corners or variations in thicknesses of different material layers, occasional screw, edge, or combination dislocations within the crystalline region, and/or occasional dislocation defects of single atoms or clusters of atoms. There may be other defects not listed here but that are common within the field of device fabrication.

Generally, embodiments herein may address a low-power driver circuit architecture for a segmented-electrode (SE) MZM. Specifically, embodiments may use submicron general-purpose low-voltage complimentary metal-oxide semiconductor (CMOS) technology to do so. The resultant driver circuit of embodiments may have the flexibility to support non-return-to-zero (NRZ), 2-level pulse amplitude modulation (PAM-2), or 4-level pulse amplitude modulation (PAM-4) bit streams. Embodiments may further support data rates greater than approximately 50 giga symbols per second (Gb/s) for NRZ data streams, or 100 Gb/s for PAM-4 data streams.

As noted above, it may be desirable for an MZM driver to provide a large voltage swing across an array of p-n junction modulator segments, which may be distributed around the waveguide that guides light wave from a laser source through the MZM. The ER of the modulated output light wave may generally be proportional to the product of the driver output voltage swing and the length of the overall MZM.

Additionally, the design of the MZM driver may benefit from faster or higher voltage process technologies. Various legacy designs may user bipolar technologies which typically do not have fast complementary devices to realize rail-to-rail swing. As a result of these relatively low rail-to-rail swings, the MZM may suffer from power inefficiencies. By contrast, for lower-power designs, CMOS technologies may support relatively fast rail-to-rail swing.

However, submicron CMOS devices may support the use of relatively low power supply voltages. The relatively low power supply voltages may result in lower peak-to-peak values for the rail-to-rail voltage swing. Because of the relatively low swing, it may be desirable to extend the length of the MZM. However, as the MZM becomes longer, it may become increasingly difficult to maintain good eye opening of the signal propagating through the MZM. This difficulty may be further enhanced if the propagating optical signal is operating at a data rate at or above approximately 50 Gb/s.

Embodiments herein may therefore resolve the above-described concerns. Specifically, embodiments herein may relate to a circuit architecture for MZM modulator drivers operating at or above approximately 50 Gb/s in a silicon-photonic interconnect. Generally, the circuit may be designed to use a relatively low-cost, general-purpose, CMOS process. The general-purpose CMOS process may be relatively high-volume manufacturing friendly because it may support shorter fabrication cycles or larger wafer sizes. Additionally, the described driver architecture may be flexible enough to support both PAM-2 and PAM-4 modes of data traffic while consuming approximately 40% less power than legacy designs.

Generally, it may be desirable to discuss the operation of a SE MZM for the understanding of description of embodiments herein. Generally, in a SE MZM, optical power from a laser source may be guided into an optical waveguide that includes distributed p-n junction segments. The phase modulation of the optical signal may be achieved through the control of p-n junction depletion regions by using electric field from a radio frequency (RF) electrical source. Typically, the optical waveguide and the p-n junctions may be implemented on a standalone integrated circuit (IC) which hosts the anode and cathode pins of the p-n junction segments.

The driver IC may be a traveling wave amplifier that guides the RF signal through an electrical transmission line that is aligned with the optical mode in the optical waveguides, before driving the p-n junctions of the modulator segments. For accurate phase modulation, the optical delay of the light wave between the modulator segments may need to be precisely matched with the electrical delay of the RF signal through transmission lines inside the driver between the segments.

The achievable ER of the modulated optical signal may be proportional to the product of the driver output voltage amplitude levels, phase efficiency of the modulator, and the length of the modulator. If the output signal amplitude is smaller, for example if the peak-to-peak voltage is relatively low, then a longer MZM may be desirable in order to achieve a desirable ER. As used herein, ER may refer to the ratio of the power of a symbol "1" over the power of a symbol "0." Conversely, if the output signal amplitude is larger, then a shorter MZM may be used.

As a concrete example, a 9×300 micrometer (µm or micron) MZM with a 2.2 Vpp differential driver output swing may provide a modulated optical signal with an ER of 5.6 decibels (dB). However, the same MZM may only provide an ER of 3.7 dB when driven by a driver with an output swing of 1.2 Vpp differential. Generally, high-power efficiency may be desirable from the modulator driver to meet the transceiver power specifications, as well as to ensure package reliability because of the drivers close proximity to the high-power laser and an integrated laser-modulator system.

It may also be desirable that the modulator driver should provide a maximum eye opening for a signal propagating through the MZM. In an optical input output (I/O) link, the driver may be considered the last electrical stage in the transmit path, and because of the distributed nature of the outputs there may be no retiming stage following the driver. As a result, it may be desirable for driver outputs to be able to clean up any enter symbol interference (ISI) to ensure maximum eye opening of the transmitted optical signal.

Generally, legacy MZM drivers may be designed using high-speed/high-voltage bipolar processes. These processes may typically be able to produce high-speed npn transistors, but may not be able to produce complementary high-speed pnp transistors. As a result, rail-to-rail swing may not be possible, which may make the topology power inefficient.

Embodiments herein may relate to a driver circuit architecture that uses conventional, low-voltage, and general-purpose CMOS processes, which may provide rail-to-rail swing to ensure the best power efficiency. Traditional sub-micron CMOS processes may offer high-speed CMOS devices, which may operate with relatively low supply voltages. These devices may be known as a "core" device. The traditional CMOS processes may also provide relatively slow high-voltage CMOS devices, which may typically be known as an I/O device. Embodiments herein may be implemented using traditional general-purpose low-voltage submicron CMOS processes without any special high-speed/high-voltage transistors. These embodiments may, due to their lack of high-speed/high-voltage transistors, be relatively cost-effective.

Figure 1:
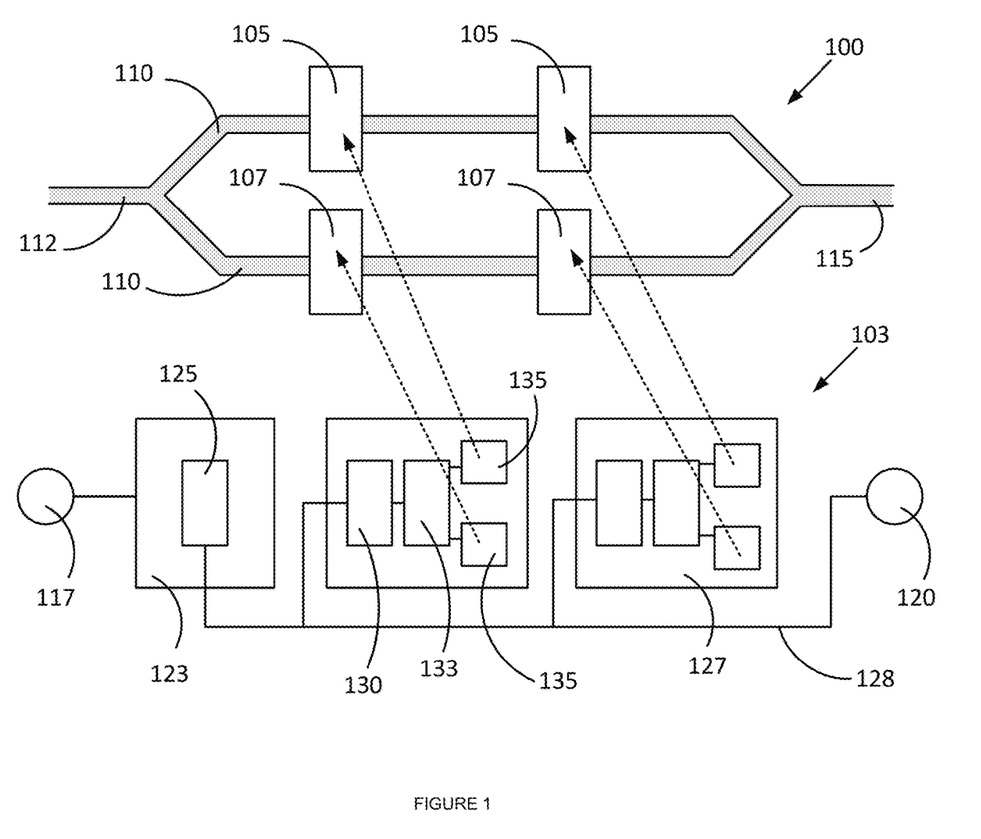
FIG. 1 illustrates a highly simplified block diagram of an optical transmitter with an example MZM that has a segment driver with a continuous-time linear equalizer (CTLE), in accordance with various embodiments.

FIG. 1 illustrates a highly simplified block diagram of an optical transmitter with an example MZM that has a segment driver with a CTLE, in accordance with various embodiments. Specifically, the MZM may include a photonic IC 100 and an electrical IC 103. Generally, the photonic IC 100 may include an optical signal input 112 wherein an unmodulated optical signal may be input, for example from a laser. The optical signal may be transmitted along two different waveguides 110, each with a plurality of modulator segments 105. The modulator segments 105 may modulate the optical signal where it is then recombined and a modulated optical signal is output at output 115. Through modulation of the optical signal, data may be introduced into the output optical signal.

As noted above, an RF signal may be supplied to the modulator signals 105. Specifically, the RF signal may be introduced through the electrical IC 103. More specifically, the electrical IC 103 may have an input 117. The input signal may be a differential input signal, and may be received, for example, from a clock and data recovery (CDR) chip.

The input signal may be input to a transmission line driver 123, which may include a CTLE 125. The CTLE may boost high-frequency components of the input signal, which may result in opening the signal eye of the optical signal propagating through the photonic IC 100. Specifically, as the optical signal propagates throughout the photonic IC 100 and is modulated by modulator segments 105 and 107, the optical signal may suffer from inter-symbol interference (ISI) introduced by loss in the interconnect between the CDR and the electrical IC 103, or between various segment drivers 127 of the electrical IC 103. The ISI may result in the signal eye collapsing and the signal itself losing resolution or coherency. By reducing the ISI of the optical signal, the signal eye may maintain resolution through a relatively long MZM, thereby providing a reliably modulated output signal at the output 115 of the photonic IC 100.

The electrical signal, after being boosted by the CTLE, may be output by the transmission line driver 123 to transmission line 128. The transmission line 128 may be coupled with a plurality of segment drivers 127. Respective ones of the segment drivers 127 may have a plurality of elements as depicted in FIG. 1. Specifically, a segment driver 127 may include a CTLE 130 at the input of the segment driver 127. As noted above, the CTLE may boost high-frequency components of the input signal to reduce ISI that may be introduced by loss in the interconnect between various ones of the segment drivers 127. The boosted signal may then be output from CTLE 130 to an amplifier stage 133. The amplifier stage 133 may boost the signal where it is then output to output pads 135. As indicated by the dashed lines, output pads 135 may be electrically coupled with modulator segments 105 and 107. Specifically, the signal output from the output pads 135 may be used to drive the modulator segments 105, which may in turn modulate the optical signal propagating through the photonic IC 100. As the RF signal propagates from one segment driver to another segment driver 127 while modulating optical signal through different modulator segments 105/107, it may be desirable to match the electrical propagation delay through transmission lines between segment drivers with the optical propagation delay through waveguides 110 between modulator segments for accurate modulation. It may further be desirable to design the transmission line 128 to match the propagation delay requirements. In some embodiments, the output pads 135 may have between an approximately 10 ohm and approximately 20 ohm single-ended output impedance per output pad 135. The transmission line 128 may terminate at an output 120 which may be, for example, 100-Ohm differential.

Figure 2:
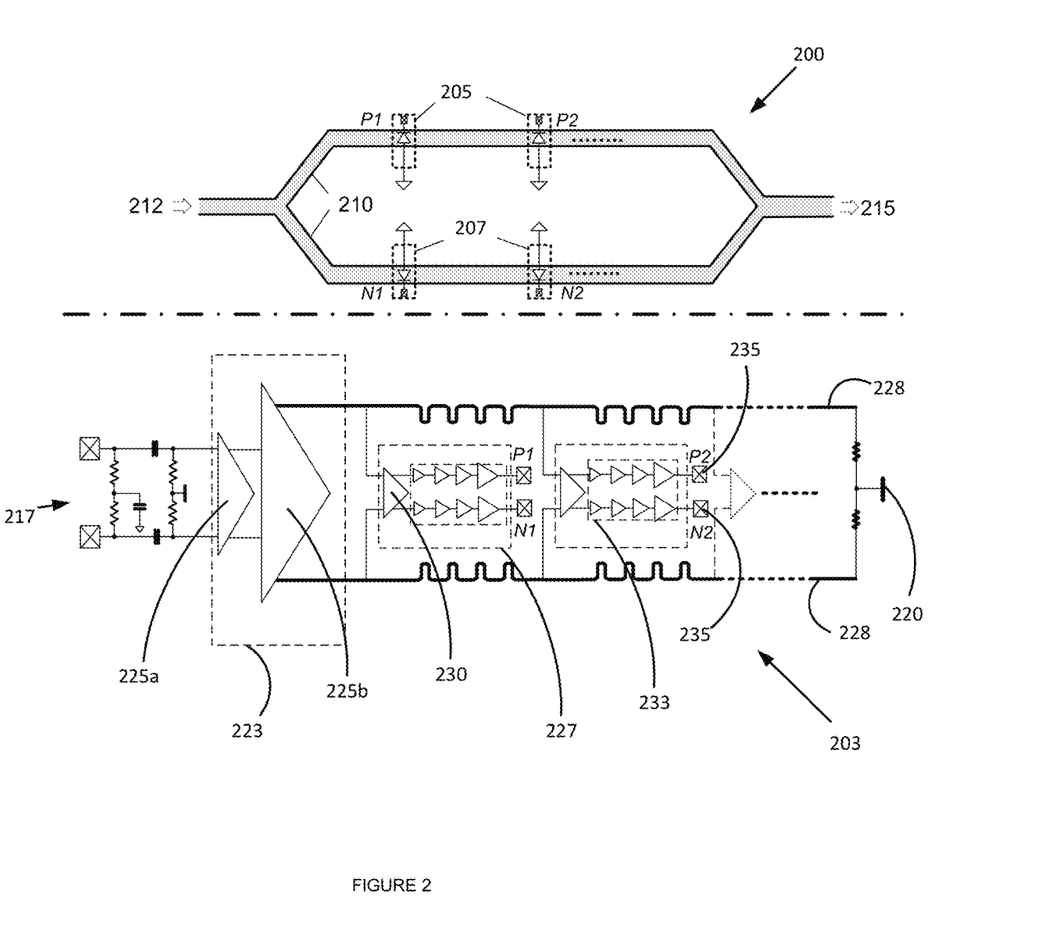
FIG. 2 illustrates an example diagram of an optical transmitter that has an MZM with a segment driver that includes a CTLE, in accordance with various embodiments.

FIG. 2 illustrates an example diagram of an optical transmitter that has an MZM with a segment driver that includes a CTLE, in accordance with various embodiments. Generally, FIG. 2 may be considered to be a more detailed diagram of the MZM depicted in FIG. 1, showing additional or alternative levels of detail. Similarly to FIG. 1, the MZM of FIG. 2 may include a photonic IC 200 and an electrical IC 203. The photonic IC 200 may include an optical signal input 212, a pair of waveguides 210, modulator segments 205 and 207, and an optical signal output 215 which may be respectively similar to optical signal input 112, waveguides 110, modulator segments 105 and 107, and optical signal output 115.

Similarly, the electrical IC 203 may include an input 217 and an output 220 which may be respectively similar to input 117 and output 120. The electrical IC 203 may additionally include a transmission line driver 223, which may be generally similar to transmission line driver 123. However, as can be seen in FIG. 2, the transmission line driver 223 may include two pre-driver/CTLE 225*a* and driver/CTLE 225*b* in sequence. The reason that two CTLEs 225 may be desirable is because the transmission line may be lossy, and a single-stage CTLE may not be adequate. A smaller size pre-driver 225*a* may be needed to limit input capacitance.

The electrical IC 203 may also include a plurality of segment drivers 227, which may be generally similar to segment driver 127. In the embodiment of FIG. 2, the segment driver 227 may include a CTLE 230 and an amplifier stage 233. As can be seen, the amplifier stage 233 may include a plurality of amplifiers. Specifically, the amplifier stage 233 may include two sets of amplifiers in sequence, wherein the sets are in parallel with one another. Additionally, as noted above, implementations of the MZM using CMOS processes may be beneficial. Particularly, the amplifier stage 233 may be implemented using CMOS processes on both the p and n sides to achieve desirable rail-to-rail swing. If the electrical IC 203 uses a 1.1 volt (V) power supply, the single-ended outputs of the CTLE stages (e.g., where the CTLE 230 is coupled with the amplifier stage 233) may be approximately 400 millivolts (mV) peak-to-peak. The CMOS-based amplifier stage 233 may convert the outputs to 1.1 V peak-to-peak or 2.2 V peak-to-peak, which may then be applied across the modulator segments 205 and 207.

In the embodiment of FIG. 2, each of the segment drivers 227 may be coupled with output pads 235, which may be generally similar to output pads 135. Generally, in FIG. 2, the output pad 235 labeled "P1" may provide an electrical output to the modulator segment 205 labeled "P1." Similarly, the output pads 235 labeled "N1," "P2," and "NT" may be respectively configured to provide an electrical output to the modulator segments 205 labeled "N1," "P2," and "N2." In the embodiment of FIG. 2, the output pads 235 may be considered separate from, but coupled with, the segment driver 227. By contrast, in other embodiments, such as the embodiment of FIG. 1, the output pads 135 may be considered an element of the segment driver 127.

The electrical IC 203 may further include transmission lines 228, which may be generally similar to transmission line 128. It will be understood that the depiction of the single transmission line 128 of FIG. 1 is intended as a simplified example, and in real-world embodiments the electrical IC 203 may include the dual parallel transmission lines 228 depicted in FIG. 2. Additionally, as can be seen in some areas the transmission lines 228 may be generally crimped. The purpose of this crimping may be to alter the overall length of the transmission line so that the timing of the optical signal in the photonic IC 200 and the electrical signal in the electrical IC 203 may remain generally in phase with one another. Specifically, the overall length of the transmission lines 228 may be approximately 1.5 times as long as the length of the waveguides 210.

Generally, as mentioned above, the transmission lines 228 may be relatively lossy and may have approximately 5 dB insertion loss for an MZM of length 2.7 millimeters (mm). The insertion loss may cause eye closures due to ISI introduced by the transmission lines 228 as described above. To open-up the eye, the segment drivers 227 and the transmission line driver 223 may include CTLEs 225 and 230. Specifically, each segment driver 227 and the transmission line driver 223 may have a different CTLE which may be used to optimize the eye opening of the applied voltage signal at each of the output pads 235. In other words, each of the CTLEs 225 and 230 may operate slightly differently from one another to optimize the signal being output back to the modulator segments 205 and 207. The CTLEs 225 and 230 may be particularly beneficial when the data rate of the optical signal is at or above approximately 50 Gb/s as discussed above.

Figure 3:
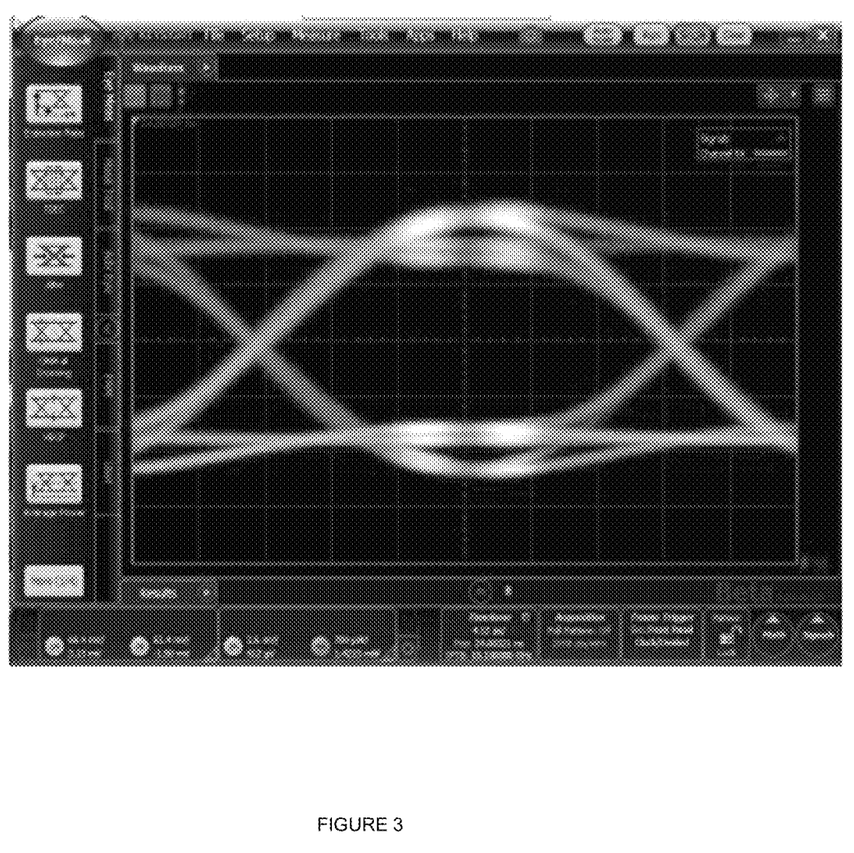
FIG. 3 illustrates an example modulator output optical eye, in accordance with various embodiments.

FIG. 3 illustrates an example modulator output optical eye, in accordance with various embodiments. Specifically, FIG. 3 depicts an experimental result related to an optical signal output at optical signal output 215. As can be seen in FIG. 3, the optical signal may have a well-defined eye.

As noted above, embodiments herein may be configured to accommodate either PAM-2 or PAM-4 operation. Specifically, the output stages of a segment driver, as noted above, may be designed using CMOS-based amplifiers to achieve a desirable rail-to-rail swing. For electrical PAM-4 operation, the segment driver stages of the MZM may be designed with linear differential amplifiers.

Figure 4:
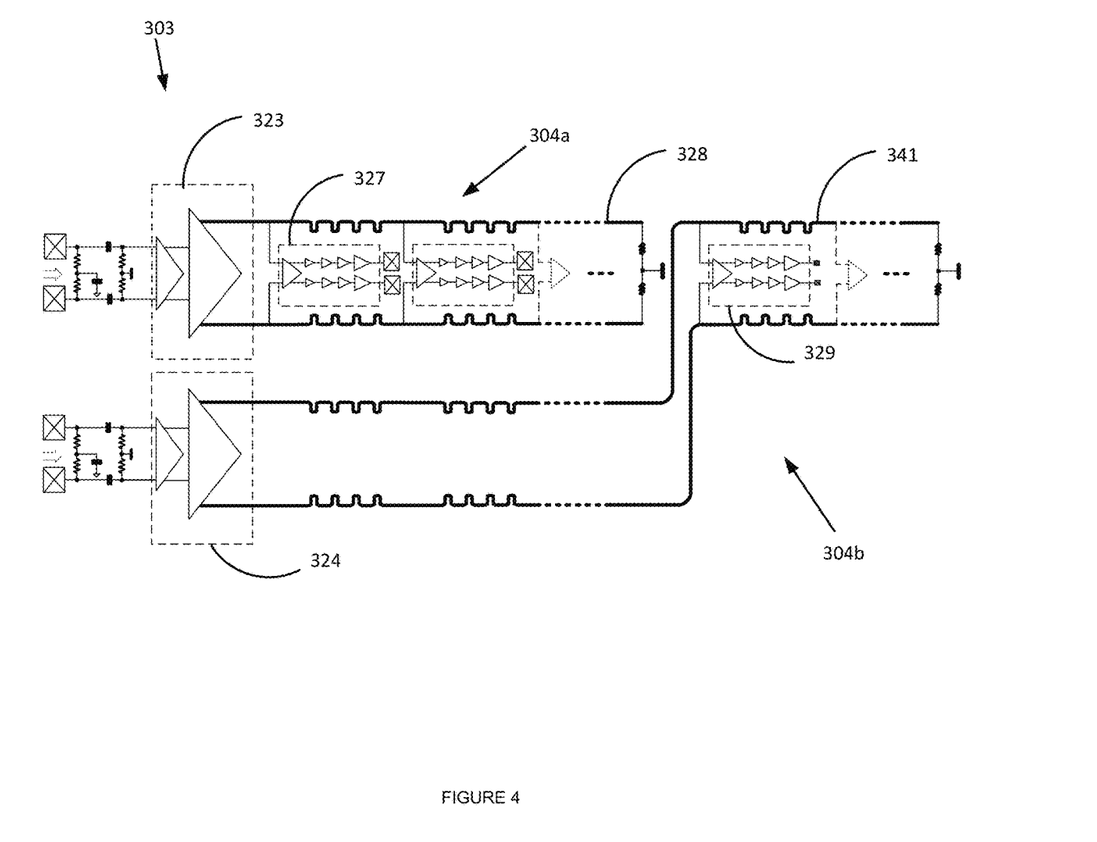
FIG. 4 illustrates an alternative example diagram of an optical transmitter that has an MZM with a segment driver that includes a CTLE, in accordance with various embodiments.

FIG. 4 illustrates an alternative example diagram of an optical transmitter that has an MZM with a segment driver that includes a CTLE, in accordance with various embodiments. Specifically, FIG. 4 depicts an MZM with a CTLE, wherein the MZM is extended to PAM-4 operation. Generally, the structural elements of the optical IC of the MZM may be similar to the optical ICs 100 or 200, and so is not reproduced here for the sake of lack of repetition. Additionally, because elements of the electrical IC 303 of FIG. 4 are similar to elements already described with respect to FIG. 2, the elements may not be specifically enumerated and called out again in this description. However, it can be seen from FIG. 4 that, for example, the various transmission line drivers or the segment drivers may include CTLE(s), amplifier stage(s), output pad(s), etc.

Specifically, FIG. 4 depicts an electrical IC 304 which may share similarities with the electrical ICs 103 or 203 of FIG. 1 or 2, respectively. Specifically, the electrical IC 303 may include a most significant bit (MSB) lane 304a and a least significant bit (LSB) lane 304b. The MSB lane 304a and the LSB lane 304b may respectively include a transmission line driver 323/324, a segment driver 327/328, and transmission lines 340/341 which may be respectively similar to transmission line driver 223, segment driver 227, and transmission lines 228.

Generally, the MZM that uses the electronic IC 303 may use two input NRZ data streams (i.e., the MSB stream and the LSB stream) which may have the same data rate as one another. Each input bit stream may be amplified by separate transmission line drivers (e.g., transmission lane driver 323 and 324), which may respectively drive transmission lines 340 and 341. Similarly to the transmission line drivers 113 or 223, the transmission line drivers 323 and 324 may include CTLEs, which may clean up the ISI of the signal propagating through the electrical IC.

Generally, the MSB lane 304a may drive MSB-related segments of the optical modulator (i.e., a modulator segment such as modulator segment 205 which is dedicated to the MSB of the optical data propagating through the MZM). Similarly, the LSB lane 304b may drive LSB-related segments of the optical modulator (i.e., a modulator segment such as modulator segment 205 which is dedicated to the LSB of the optical data propagating through the MZM).

Generally, as can be shown in FIG. 4, it may be desirable for the MZM to have MSB and LSB modulators with a 2:1 ratio (e.g., 2 segment drivers 327 for the MSB lane 304a, and 1 segment driver 328 for the LSB lane 304b). In general, both the MSB lane 304a and the LSB lane 304b may use identical segment drivers 327 and 328 to drive each segment of the modulator of the associated photonic IC. In the embodiment of FIG. 4, the segment drivers 327 and 328 may convert current-mode logic (CML) signals of approximately 800 mV peak-to-peak differential to a differential CMOS rail-to-rail output of 1.1 V peak-to-peak at each output pin, or 2.2 V peak-to-peak differential between a pair of differential output pins.

In some embodiments, the output of the photonic IC (which may be similar to optical signal outputs 115 or 215) may sum the modulated optical signals that are output by modulator segments coupled with the various segment drivers of the MSB lane 304a and the LSB lane 304b. Generally, it may be desirable for the optical delay from the last MSB-associated modulator segment to the first LSB-associated modulator segment to match with the electrical delay from the last segment driver 327 of the MSB lane 304a to the first segment driver 341 of the LSB lane 304b. This match may be accomplished in a variety of ways. A first technique may be to generate the required delay in the LSB-related transmission line driver 324 before the first segment. Another technique, which may be used in addition to, or as an alternative to, the first technique may be to generate the required delay in the CDR IC that is coupled with the electrical IC 303. Other techniques may be envisioned in other embodiments.

Figure 5:
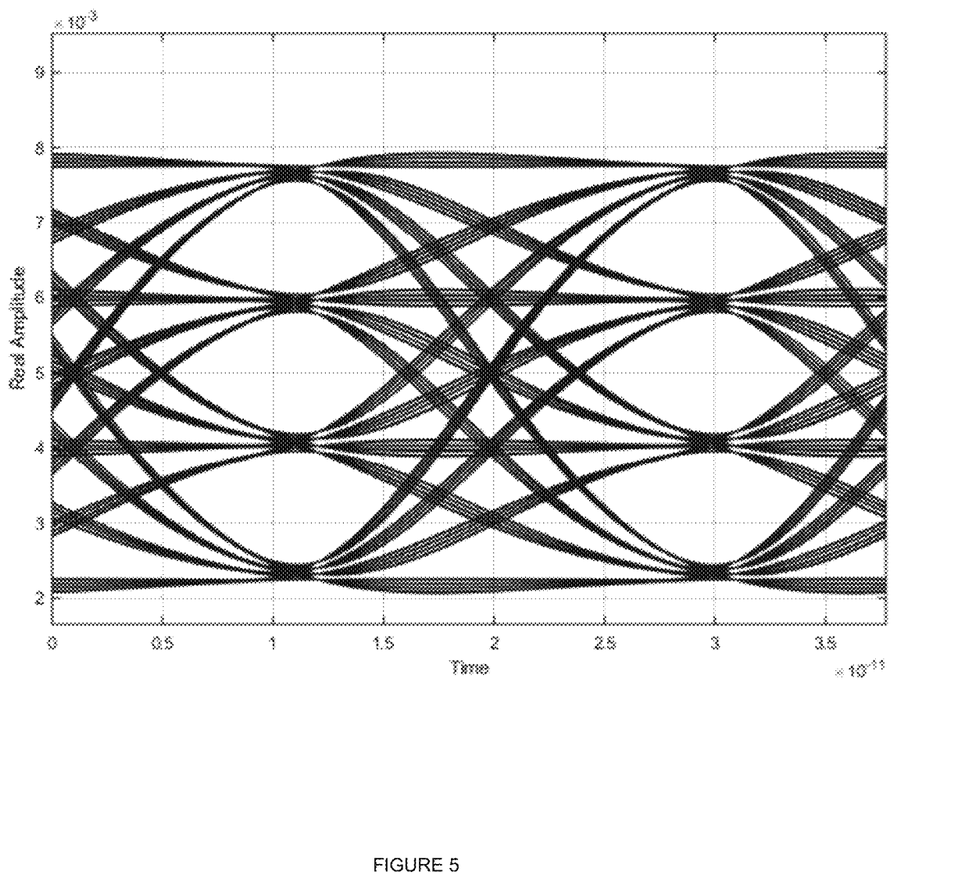
FIG. 5 illustrates an example modulator output optical eye, in accordance with various embodiments.

FIG. 5 illustrates an example modulator output optical eye, in accordance with various embodiments. Specifically, FIG. 5 depicts a simulated result related to an optical signal output by an MZM that uses the electrical IC 303 of FIG. 4. As can be seen in FIG. 5, the optical signal may have a well-defined eye.

It will be understood that the above-described embodiments are intended as examples, and other embodiments may vary from those depicted in FIG. 1, 2, or 4. For example, although only eight amplifiers are depicted in an amplifier stage such as amplifier stages 227/327/328/etc., other embodiments may have more or fewer amplifiers. Similarly, other embodiments may have more or fewer segment drivers, modulator segments, CTLEs in a transmission driver or a segment driver, etc.

Figure 6:
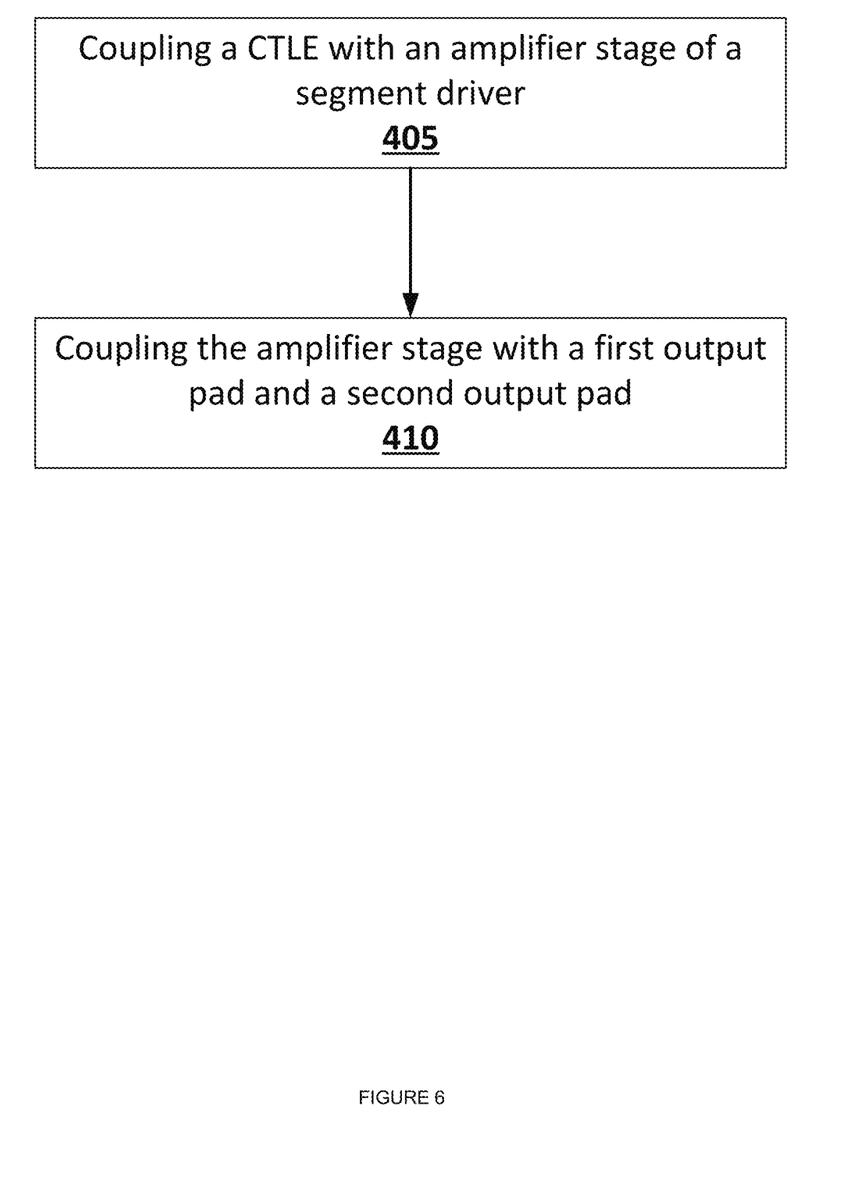
FIG. 6 illustrates an example flowchart for generating a segment driver that includes a CTLE, in accordance with various embodiments.

FIG. 6 illustrates an example flowchart for generating a segment driver that includes a CTLE, in accordance with various embodiments. Specifically, the technique may include coupling, at 405, a CTLE with an amplifier stage of a segment driver. The CTLE may be, for example, similar to CTLE 230 of FIG. 2, or some other CTLE discussed herein. The amplifier stage may be similar to, for example, amplifier stage 233 of FIG. 2 or some other amplifier stage discussed herein. The technique may further include coupling, at 410, the amplifier stage with a first output pad and a second output pad. The output pads may be similar to, for example, output pads 235 of FIG. 2. In this manner, a segment driver such as segment drivers 127, 227, or some other type of segment driver may be generated. As noted above, in some embodiments the segment driver may not be considered to include the output pads, and therefore element 410 may not occur. In some embodiments, the elements may be performed in a different order. For example, elements 405 and 410 may be performed simultaneously, or element 410 may be performed prior to element 405. Other variations may be present in other embodiments.

EXAMPLES OF VARIOUS EMBODIMENTS

Example 1 includes a segment driver to be coupled with a modulator segment of a Mach-Zehnder modulator, wherein the segment driver includes: an amplifier stage; and a continuous-time linear equalizer (CTLE) incorporated within the amplifier stage, wherein the CTLE is to: identify an electrical signal that is related to an optical signal of the Mach-Zehnder modulator; reduce inter-symbol interference (ISI) of the electrical signal to generate a processed electrical signal; and output the processed electrical signal to the amplifier stage.

Example 2 includes the segment driver of example 1, wherein reduction of the ISI of the electrical signal results in an increase in eye opening of a waveform of the optical signal.

Example 3 includes the segment driver of examples 1 or 2, or some other example herein, wherein the segment driver further includes an output pad electrically coupled with the amplifier stage, wherein the amplifier stage is electrically positioned between the CTLE and the output pad.

Example 4 includes the segment driver of example 3, wherein the output pad has between a 10 Ohm and a 20 Ohm single-ended output impedance when the Mach-Zehnder modulator is in operation.

Example 5 includes the segment driver of examples 1 or 2, or some other example herein, wherein the optical signal has a data rate of greater than 50 giga symbols per second.

Example 6 includes the segment driver of examples 1 or 2, or some other example herein, wherein the segment driver is implemented in a complimentary metal-oxide semiconductor (CMOS) chip.

Example 7 an optical transmitter that includes a Mach-Zehnder modulator, wherein the optical transmitter comprises: a first waveguide for propagation of an optical signal; a second waveguide for propagation of an optical signal; and a modulator segment that optically couples a first segment of the first waveguide with a second segment of the first waveguide; and a segment driver electrically coupled with the modulator segment, wherein the segment driver includes: an amplifier stage; a continuous-time linear equalizer (CTLE) electrically coupled with the amplifier stage; and a first output pad and a second output pad electrically coupled with the amplifier stage such that the amplifier stage is electrically positioned between the CTLE and the first and second output pads.

Example 8 includes the optical transmitter of example 7, further comprising: a transmission line that electrically couples the segment driver and the modulator segment; and a transmission line driver electrically coupled with the transmission line, wherein the transmission line driver includes a CTLE.

Example 9 includes the optical transmitter of example 8, wherein propagation delay of radio frequency (RF) signals in the transmission line is aligned with propagation delay of an optical mode of the optical signal.

Example 10 includes the optical transmitter of any of examples 7-9, or some other example herein, wherein the CTLE is to: receive an electrical signal that is related to the optical signal of the first waveguide; reduce inter-symbol interference (ISI) of the electrical signal to generate a cleaned electrical signal; and output the cleaned electrical signal to the amplifier stage.

Example 11 includes the optical transmitter of example 10, wherein the electrical signal is related to a most significant bit (MSB) of data of the optical signal.

Example 12 includes the optical transmitter of example 10, wherein the electrical signal is related to a least significant bit (LSB) of data of the optical signal.

Example 13 includes the optical transmitter of example 10, wherein electrical delay of the electrical signal is matched with optical delay of the optical signal.

Example 14 includes the optical transmitter of any of examples 7-9, or some other example herein, wherein the first output pad is coupled with the first waveguide and the second output pad is coupled with the second waveguide.

Example 15 includes the optical transmitter of any of examples 7-9, or some other example herein, wherein the first output pad has between a 10 Ohm and a 20 Ohm single-ended output impedance when the Mach-Zehnder modulator is in operation.

Example 16 includes the optical transmitter of any of examples 7-9, or some other example herein, wherein the optical signal has a data rate of greater than 50 giga symbols per second.

Example 17 includes the optical transmitter of any of examples 7-9, or some other example herein, wherein the segment driver is implemented in a complimentary metal-oxide semiconductor (CMOS) chip.

Example 18 includes a method of forming a segment driver for a Mach-Zehnder optical modulator, wherein the method includes: coupling a continuous-time linear equalizer (CTLE) with an amplifier stage of the modulator segment, wherein the CTLE is to reduce inter-symbol interference (INI) of an electrical signal related to an optical signal of the Mach-Zehnder optical modulator; and coupling the amplifier stage with a first output pad and a second output pad.

Example 19 includes the method of example 18, wherein the reduction of the ISI of the electrical signal results in an increase in eye opening of a waveform of the optical signal.

Example 20 includes the method of example 18, wherein the first output pad has between a 10 Ohm and a 20 Ohm single-ended output impedance when the Mach-Zehnder optical modulator is in operation.

Example 21 includes the method of any of examples 18-20, or some other example herein, wherein the optical signal has a data rate of greater than 50 giga symbols per second.

Example 22 includes the method of any of examples 18-20, or some other example herein, wherein the first output pad is to couple with a modulator segment of a first waveguide of the Mach-Zehnder optical modulator, and wherein the second output pad is to couple with a modulator segment of a second waveguide of the Mach-Zehnder optical modulator.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. A segment driver to be coupled with a modulator segment of a Mach-Zehnder modulator, wherein the segment driver includes:
   an amplifier stage; and
   a continuous-time linear equalizer (CTLE) incorporated within the amplifier stage, wherein the CTLE is to:
      identify an electrical signal that is related to an optical signal of the Mach-Zehnder modulator;
      reduce inter-symbol interference (ISI) of the electrical signal to generate a processed electrical signal; and
      output the processed electrical signal to the amplifier stage.

2. The segment driver of claim 1, wherein reduction of the ISI of the electrical signal results in an increase in eye opening of a waveform of the optical signal.

3. The segment driver of claim 1, wherein the segment driver further includes an output pad electrically coupled with the amplifier stage, wherein the amplifier stage is electrically positioned between the CTLE and the output pad.

4. The segment driver of claim 1, wherein the optical signal has a data rate of greater than 50 giga symbols per second.

5. The segment driver of claim 1, wherein the segment driver is implemented in a complimentary metal-oxide semiconductor (CMOS) chip.

6. An optical transmitter that includes a Mach-Zehnder modulator, wherein the optical transmitter comprises:
   a first waveguide for propagation of an optical signal;
   a second waveguide for propagation of an optical signal; and
   a modulator segment that optically couples a first segment of the first waveguide with a second segment of the first waveguide; and
   a segment driver electrically coupled with the modulator segment, wherein the segment driver includes:
      an amplifier stage;
      a continuous-time linear equalizer (CTLE) electrically coupled with the amplifier stage; and
      a first output pad and a second output pad electrically coupled with the amplifier stage such that the amplifier stage is electrically positioned between the CTLE and the first and second output pads.

7. The optical transmitter of claim 6, further comprising:
   a transmission line that electrically couples the segment driver and the modulator segment; and
   a transmission line driver electrically coupled with the transmission line, wherein the transmission line driver includes a CTLE.

8. The optical transmitter of claim 6, wherein the CTLE is to:
   receive an electrical signal that is related to the optical signal of the first waveguide;
   reduce inter-symbol interference (ISI) of the electrical signal to generate a cleaned electrical signal; and
   output the cleaned electrical signal to the amplifier stage.

9. The optical transmitter of claim 8, wherein the electrical signal is related to a most significant bit (MSB) of data of the optical signal.

10. The optical transmitter of claim 8, wherein the electrical signal is related to a least significant bit (LSB) of data of the optical signal.

11. The optical transmitter of claim 8, wherein electrical delay of the electrical signal is matched with optical delay of the optical signal.

12. The optical transmitter of claim 6, wherein the first output pad is coupled with the first waveguide and the second output pad is coupled with the second waveguide.

13. The optical transmitter of claim 6, wherein the first output pad has between a 10 Ohm and a 20 Ohm single-ended output impedance when the Mach-Zehnder modulator is in operation.

14. The optical transmitter of claim 6, wherein the optical signal has a data rate of greater than 50 giga symbols per second.

15. The optical transmitter of claim 6, wherein the segment driver is implemented in a complimentary metal-oxide semiconductor (CMOS) chip.

16. A method of forming a segment driver for a Mach-Zehnder optical modulator, wherein the method includes:
   coupling a continuous-time linear equalizer (CTLE) with an amplifier stage of a modulator segment, wherein the CTLE is to reduce inter-symbol interference (ISI) of an electrical signal related to an optical signal of the Mach-Zehnder optical modulator; and
   coupling the amplifier stage with a first output pad and a second output pad.

17. The method of claim 16, wherein reduction of the ISI of the electrical signal results in an increase in eye opening of a waveform of the optical signal.

18. The method of claim 16, wherein the first output pad has between a 10 Ohm and a 20 Ohm single-ended output impedance when the Mach-Zehnder optical modulator is in operation.

19. The method of claim 16, wherein the optical signal has a data rate of greater than 50 giga symbols per second.

20. The method of claim 16, wherein the first output pad is to couple with a modulator segment of a first waveguide of the Mach-Zehnder optical modulator, and wherein the second output pad is to couple with a modulator segment of a second waveguide of the Mach-Zehnder optical modulator.

* * * * *